Aug. 8, 1967 S. A. TROTT 3,334,796

CAPSTAN PINCH WHEEL CONTROL FOR MAGNETIC TAPE DRIVES

Filed Oct. 22, 1965

SAMUEL A. TROTT
INVENTOR.

KENDRICK, SUBKOW and STOLZY
BY A Donald Stolzy
ATTORNEYS

United States Patent Office 3,334,796

Patented Aug. 8, 1967

3,334,796

CAPSTAN PINCH WHEEL CONTROL FOR MAGNETIC TAPE DRIVES

Samuel A. Trott, 10049 Rubio Ave., Granada Hills, Calif. 91344

Filed Oct. 22, 1965, Ser. No. 501,534
4 Claims. (Cl. 226—90)

This invention relates to magnetic record players and the like, and more particularly to a control for a friction drive for a magnetic tape.

In the past controls for magnetic tape drives have not been provided with positive locks and have been unusually large in size.

In accordance with the device of the present invention, the above-described and other disadvantages of the prior art are overcome by providing a combination of structures with a magnetic tape drive having a capstan on a housing. This combination of structures includes a main shaft rotatable on the housing. A stub shaft is fixed to the main shaft at one point along its length, the stub shaft being tapered outwardly of the main shaft. A pinch wheel is also provided which is rotatable on the stub shaft. A projection is then provided to engage the stub shaft taper to lock the pinch wheel in engagement with the capstan. By the use of this simple means, control of the tape drive is maintained with very few, small and uncomplicated component parts.

The above-described and other advantages of the present invention will be better understood from the following description when considered in connection with the accompanying drawings.

In the drawings, which are to be regarded as merely illustrative:

The device of the present invention may be employed to control a pinch wheel against a capstan drive as illustrated in, for example, U.S. Patent No. 2,876,005.

Figure 2:
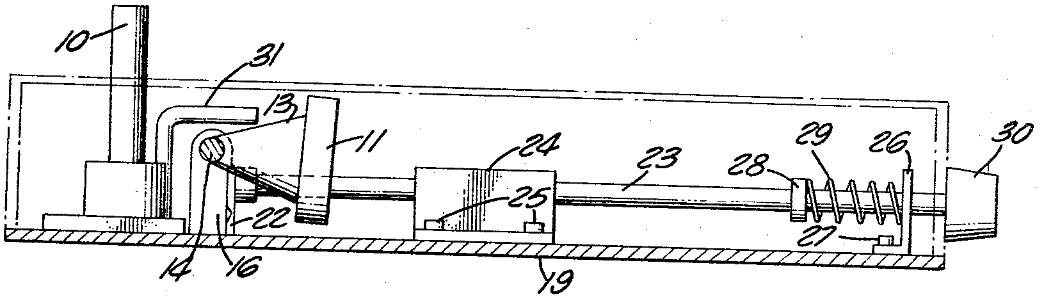
FIG. 2 is a side elevational view, partly in section, of the control mechanism of the present invention when in a deactuated position.
Figure 3:
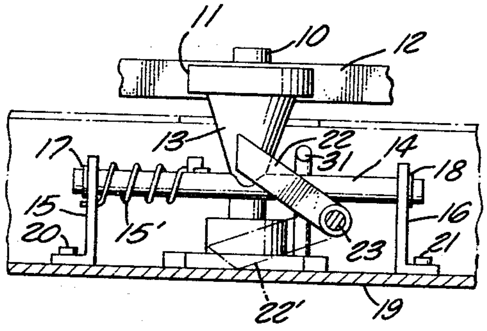
FIG. 3 is a transverse sectional view of the control mechanism of the present invention.

As shown in FIG. 3, a capstan drive shaft 10 is provided against which a pinch wheel 11 presses a magnetic tape 12. Pinch wheel 11 is rotatable on a conical stub shaft 13 fixed to a main shaft 14. In FIG. 3, the pinch wheel 11 is shown in its actuated position. It is normally biased to the position shown in FIG. 2 by a coil spring 15 and about main shaft 14. Main shaft 14 is carried in brackets 15 and 16 by snap rings 17 and 18, which brackets are fastened to a housing 19 by screws 20 and 21.

The control mechanism of the present invention includes an arm 22 which is fixed to a shaft 23. Arm 22 bears against the conical surface of stub shaft 13 and lifts pinch wheel 11 from the position shown in FIG. 2 to the position shown in FIGS. 1 and 3 as shaft 23 is turned to the right, as viewed in FIG. 3. Shaft 23 is carried by a bearing 24 bolted to housing 19 at 25, and a bracket 26 bolted at 27 to housing 19. Shaft 23 has a collar 28 fixed thereto and a coil spring 29 therearound between collar 28 and bracket 26. Shaft 23 has a knurled, manually operable knob 30 fixed to its right end as viewed in FIGS. 1 and 2.

Figure 1:
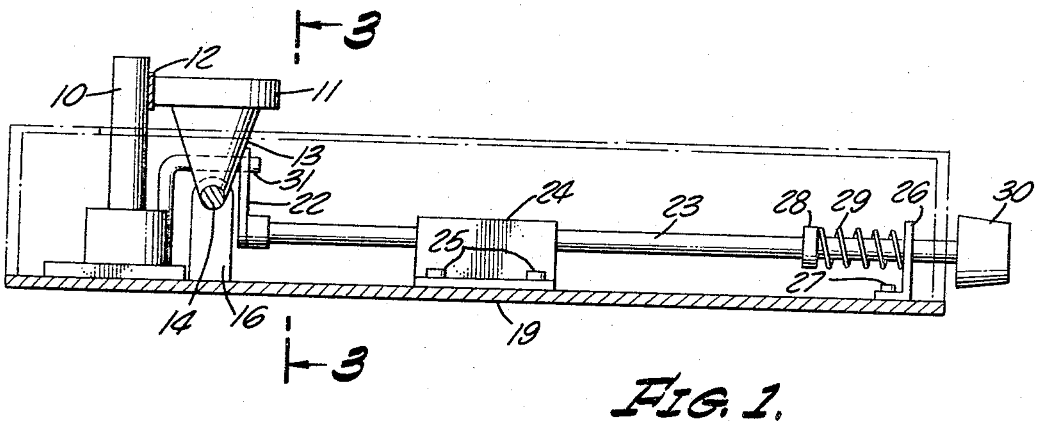
FIG. 1 is a side elevational view, partly in section, of the control mechanism of the present invention in an actuated position.

As shown in all three FIGS. 1, 2 and 3, arm 22 is provided with a stop 31.

Arm 22 is moved to dotted line position 22' shown in

FIG. 3 when pinch wheel 11 is located in its deactuated position, as shown in FIG. 2.

Note will be taken that spring 29 urges shaft 23 and arm 22 to the left as viewed in FIGS. 1 and 2 against stub shaft 13 when arm 22 is located in its actuated position.

From the foregoing, it will be appreciated that stub shaft 13 need not be conical, but may be beveled on one side only.

In accordance with the present invention, by the use of the simple means of arm 22 and stub shaft 13, control of a magnetic tape drive is maintained with very few small and uncomplicated parts.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. In a magnetic tape drive having a capstan on a housing, the combination comprising: a main shaft rotatable on said housing; a stub shaft fixed to said main shaft at one point along its length, said stub shaft being tapered outwardly from said main shaft; a pinch wheel rotatable on said stub shaft; and a projection to engage said taper to lock said pinch wheel in engagement with said capstan.

2. In a magnetic tape drive having a capstan on a housing, the combination comprising: a mainshaft rotatable on said housing; a stub shaft fixed to said main shaft at one point along its length, said stub shaft being tapered outwardly from said main shaft; a pinch wheel rotatable on said stub shaft; a projection to engage said taper to lock said pinch wheel in engagement with said capstan; a control shaft fixed to said projection; a bearing surrounding said control shaft; a collar fixed to said control shaft; and a compression spring coiled around said control shaft against said collar to urge said control shaft toward said stub shaft.

3. In a magnetic tape drive having a capstan on a housing, the combination comprising: a main shaft rotatable on said housing; a stub shaft fixed to said main shaft at one point along its length, said stub shaft being tapered outwardly from said main shaft; a pinch wheel rotatable on said stub shaft; a projection to engage said taper to lock said pinch wheel in engagement with said capstan; a control shaft fixed to said projection and mounted to move rotatably and axially on said housing; and spring means to urge said shaft axially toward said stub shaft.

4. In a magnetic tape drive having a capstan on a housing, the combination comprising: a main shaft rotatable on said housing; a stub shaft fixed to said main shaft at one point along its length, said stub shaft being tapered outwardly from said main shaft; a pinch wheel rotatable on said stub shaft; a projection to engage said taper to lock said pinch wheel in engagement with said capstan; and stop means for said projection to lock said projection in place against said stub shaft.

References Cited

UNITED STATES PATENTS 3,027,112 3/1962 Flan ------------ 242—55.13

M. HENSON WOOD, Jr., *Primary Examiner.*

ALLEN N. KNOWLES, *Examiner.*